United States Patent [19]

Jelks

[11] 4,125,063
[45] Nov. 14, 1978

[54] CONTINUOUS DIGESTER

[76] Inventor: James W. Jelks, Rte. 4, Box 6, Sand Springs, Okla. 74063

[21] Appl. No.: 857,010

[22] Filed: Dec. 2, 1977

[51] Int. Cl.² ............................................. A23N 17/00
[52] U.S. Cl. ........................................ 99/471; 99/478; 99/516; 99/534; 366/603
[58] Field of Search ................. 99/467, 471, 477, 478, 99/485, 516, 534, 536; 426/54, 511, 518, 519, 635, 636, 807; 366/290, 291, 603; 241/246

[56] References Cited

U.S. PATENT DOCUMENTS

| | | | |
|---|---|---|---|
| 2,638,837 | 5/1953 | Tamley et al. | 99/471 X |
| 2,638,838 | 5/1953 | Tamley et al. | 99/471 X |
| 3,667,961 | 6/1972 | Algeo | 426/635 X |
| 3,841,465 | 10/1974 | Miller, Jr. et al. | 241/246 X |

*Primary Examiner*—Philip R. Coe
*Attorney, Agent, or Firm*—Head, Johnson & Chafin

[57] ABSTRACT

An apparatus for use in the continuous treatment of cellulosic matter to improve the digestibility thereof, comprising means for receiving finely divided cellulosic matter, acidic process chemicals, and steam; a first attrition mill wherein the steam, cellulosic matter, and process chemicals are intimately mixed and initially reacted; a reactor with rotatable sweeps therein to complete the reaction; and a second attrition mill wherein the reacted material is neutralized to the desired level.

8 Claims, 2 Drawing Figures

CONTINUOUS DIGESTER

BACKGROUND OF THE INVENTION

Cellulose is a principal constituent of all plant matter and is an abundant, naturally renewable material. The form in which the cellulose appears varies widely, including cotton, which is nearly pure cellulose, and wood, which contains approximately 50 to 70% cellulose on an oven-dry basis. Ruminants, such as cattle and sheep, are capable of ingesting cellulosic material in large quantities, however, the amount of useable food value varies widely. The cellulose of woody plants, straw, rice hulls, bagasse, etc., in contrast to that of grasses and legumes, is largely unaffected by the ruminant digestive processes. This is due to the cellular lignin bonding which acts as a cellulose masking agent. As a consequence, woody plants, straw, rice hulls, corn cobs, bagasse, etc. have little available digestible nutrients to cattle, horses, sheep, goats, and swine.

In an effort to utilize the cellulosic materials, certain processes have been developed for increasing the digestibility of wood cellulose by chemically breaking the lignin cellulose bonds. An example is the process disclosed in U.S. patent application, Ser. No. 654,555, filed Feb. 2, 1976, and now U.S. Pat. No. 4,053,645. In the process of this application, plant matter having a low level of digestibility is mixed with water, nitric acid, and a non-oxidizing acid. For suitable reaction, the plant matter must first be finely divided. Sawdust, as from a lumber mill, is in ideal condition for processing without further physical treatment; however, straw tree bark, limbs, and the like should be divided or chipped into particles. The present invention is directed to manufacturing methods employing the basic concepts of this pending application, and particularly is directed to a process of increasing the digestibility of cellulosic material employing a continuous, as opposed to a batch, process.

SUMMARY OF THE INVENTION

The present invention contemplates an apparatus for use in the continuous treatment of cellulosic matter to improve the digestibility thereof by ruminants. The apparatus includes means for transferring finely divided plant matter, such as sawdust or wood chips to a receiving box at elevated pressure. The receiving box is provided with inlet means for admitting steam and is capable of withstanding pressure in the range of 3 to 12 atmospheres. A screw conveyor is used to transport the plant matter under pressure from the receiving box to the inlet of a first attrition mill where the plant matter is finely ground and at the same time rapidly mixed with acidic process chemicals and water. The mixed effluent from the first attrition mill is then conveyed to a reactor capable of operating in the 3 to 12 atmospheres pressure range. Internal arm sweeps are provided within the reactor vessel to prevent bridging of the reactants. The reactor size is determined so as to provide a reactant holding time of the material passing therethrough of approximately 30 minutes. The reacted products are then withdrawn from the lower portion of the reaction vessel by means of a screw conveyor and conveyed to the inlet of a second attrition mill. In the second attrition mill the acidic reaction products are mixed with a neutralizing base and discharged to storage through an automatic blow valve having shear capability to maintain the process and pressure in the reactor and attrition mill.

DESCRIPTION OF THE PREFERRED EMBODIMENT

Figure 1:
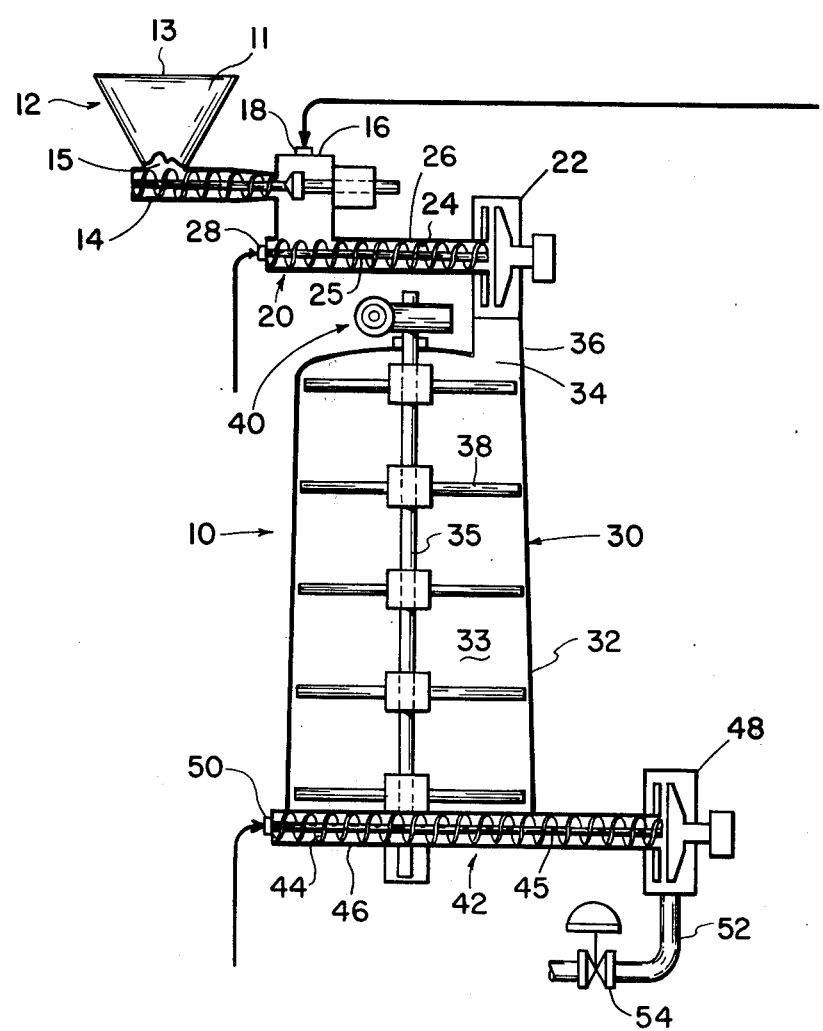
FIG. 1 is a side elevational view, partly in section of an apparatus embodying the invention for continuous treatment of cellulosic matter.

Referring to FIG. 1, reference character 10 generally indicates an apparatus for continuous treatment of cellulosic material utilizing the general process of the aforementioned Jelks co-pending application. The chip hopper 12, as shown herein, comprises a generally funnel-shaped housing 11, having the upper end 13 open for receiving raw cellulosic material, and a lower end 15 in open communication with a plug-plunger screw feeder 14 which extends from the lower end 15 of hopper 12 to a pressurized receiving box 16. The size and geometric configuration of the hopper should be determined from a consideration of the type of feed material to be processed and the particular method chosen for loading said hopper.

Figure 2:
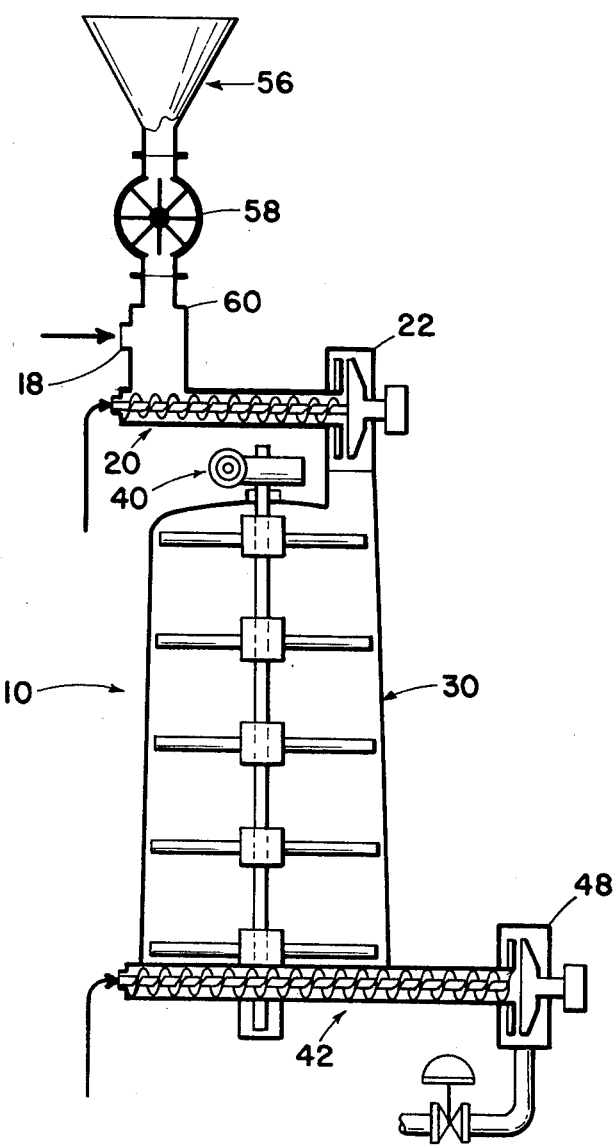
FIG. 2 is a side elevational view of alternate preferred apparatus for introducing the cellulose and steam to the receiving box.

The plug-plunger screw feeder 14 receives raw cellulosic material from hopper 12 by gravity flow and transports some longitudinally into the receiving box 16. The plug-plunger type of screw conveyor is required so that the operating pressure of the receiving box 16 may be maintained during the continuous delivery of cellulosic material thereto. In processing certain forms of raw materials, such as sawdust, a star valve 58 as shown in FIG. 2 may be used as an alternative replacement for the plug-plunger screw feeder 14. The star valve 58 is connected between hopper 56 and receiving box 60 and permits feeding of cellulosic material from the hopper 56 to the pressurized receiving box 60.

An inlet means 18 is also provided in the receiving box 16 for admitting steam into the interior thereof at about 125 psig and 365° F. The lower portion of receiving box 16 is in open communication with a second screw feeder generally indicated by reference character 20 which extends from the lower portion of said receiving box to the attrition mill 22. Screw feeder 20 is comprised of a rotatable screw or auger member 24 carried by a shaft 25 which is rotatably secured within a tubing 26. Cellulosic matter falls by gravity to the screw feeder 20 and is transported longitudinally thereby through tube 26 by the screw member 24 to the eye of the attrition mill 22. Preferably, the screw feeder 20 should be operated at approximately 25% capacity to permit mixture of the cellulosic matter and the steam. The shaft 25 of the screw member 24 is preferably hollow and is provided with inlet means 28 at one end thereof for supplying process chemicals and water to the eye of the attrition mill 22 through the hollow shaft 25. The attrition mill 22 serves to grind the cellulosic matter and rapidly mix the cellulosic matter and process chemicals under pressure.

A reactor, generally indicated herein by reference character 30 is disposed below the first attrition mill and comprises a housing 32 providing a vertical reactor chamber 33 capable of withstanding operating pressures in the range of 3 to 10 atmospheres. The upper portion of said housing 32 has an inlet port 34 in open communication with the reaction chamber 33. A vertically inclined chute 36 is connected between the attrition mill discharge outlet and the upper portion of the reactor housing 32 in substantial alignment with the inlet port 34 thereof and serves to permit passage of steam, water, chemicals and cellulosic matter by gravity flow from the attrition mill 16 to the reactor chamber 33.

A vertically disposed centrally disposed shaft 35 is suitably journalled in the housing 32 and extends through the chamber 33. A plurality of longitudinally spaced, radially extending arm sweeps 38 are secured to the shaft 35 for rotation simultaneously therewith to prevent bridging of the cellulosic material. One end of the shaft 35 is operably connected with a suitable power source 40 for rotation of the shaft and arm sweeps. The reactor vessel volume is sized from the feed flow rate to provide a retention time for the reactor contents of approximately 30 minutes.

The lower portion of the reactor chamber is in open communication with a third screw conveyor, generally indicated by reference character 42, comprised of a screw or auger member 44 carried by a shaft 45 journalled in a tubing 46. The screw 44 feeds the eye of a second attrition mill 48 with the discharging contents of the reactor 30. The shaft 45 of screw member 44 is preferably hollow and is provided with inlet means 50 at one end thereof for supplying neutralizing chemicals to the eye of the attrition mill 48 through the shaft. In the attrition mill 48, the feed or material is neutralized and discharged through line 52 connected to a suitable valve 54. Valve 54 is preferably an automatic blow valve with shear capability for maintaining pressure in the reactor vessel.

While the invention has been described with a certain degree of particularity, it is manifest that many changes may be made in the details of construction and the arrangement of components. It is understood that the invention is not to be limited to the specific embodiments set forth herein by way of exemplifying the invention, but the invention is to be limited only by the scope of the attached claim or claims, including the full range of equivalency to which each element or step thereof is entitled.

What is claimed is:

1. Apparatus for the continuous chemical conversion of cellulosic material to a digestible ruminant feed which comprises:
    means for rapidly and intimately mixing cellulosic material at atmospheric pressure with steam and acidic process chemicals at an elevated pressure;
    a reactor housing providing a vertical reaction chamber, an inlet port in open communication with the upper portion of said vertical reaction chamber, and an outlet port in open communication with the bottom portion of said reaction chamber, said reactor housing being capable of withstanding operating pressures of 3 to 10 atmospheres;
    means for directing the mixed cellulosic material, steam and acidic process chemicals at the elevated pressure to the reaction chamber through the reactor housing inlet port;
    means for removing the acidic reaction products from the outlet port of the reactor housing;
    means for mixing the removed acidic reaction products with neutralizing process chemicals to produce a neutralized feed; and
    means for discharging the neutralized feed from the apparatus while maintaining back pressure on the reaction chamber.

2. Apparatus, as recited in claim 1, further comprising:
    means disposed within the reaction chamber for preventing bridging of the reactor contents.

3. Apparatus, as recited in claim 2, wherein the means for mixing the removed acidic reaction products with neutralizing process chemicals to produce a neutralized feed comprises:
    a neutralizing attrition mill having an inlet eye for receiving the removed acidic reaction products and a discharge outlet for the neutralized feed, which mill is capable of operating under a pressure of 3 to 10 atmospheres; and
    means in communication with the neutralizing attrition mill for introducing neutralizing process chemicals to the eye of said mill.

4. Apparatus, as recited in claim 3, wherein the means for removing the acidic reaction products from the outlet port of the reaction housing comprises:
    screw feeder means, connected between the reactor housing and the neutralizing attrition mill and in open communication with the reaction chamber through the outlet port and in open communication with the eye of the neutralizing attrition mill, for conveying the acidic reaction products to the eye of the neutralizing attrition mill, said screw feeder means being capable of operating under a pressure of 3 to 10 atmospheres.

5. Apparatus, as recited in claim 4, wherein the means for discharging the neutralized feed while maintaining back pressure on the reaction chamber, comprises:
    a valve means, operably connected to the discharge outlet of the neutralizing attrition mill and having shear capability, for discharging the neutralized feed.

6. Apparatus, as recited in claim 5, wherein the means for mixing cellulosic material at atmospheric pressure with steam and acidic process chemicals at an elevated pressure, comprises:
    a receiver housing providing a receiver chamber and having an opening in open communication with the chamber for receiving cellulosic material, inlet means in open communication with the chamber for receiving steam, and a bottom discharge outlet in open communication with the chamber for discharging the steam and cellulosic material, which housing is capable of withstanding pressures in the range of 3 to 10 atmospheres;
    means connected to the receiver housing for transferring cellulosic material at atmospheric pressure to the receiver chamber when said chamber is operated at an elevated pressure without incurring significant pressure loss from said chamber;
    an acidic attrition mill, having an inlet eye for receiving the cellulosic material and steam and a discharge outlet for the pulverized cellulosic material which is capable of operating under a pressure of 3 to 10 atmospheres;
    second screw feeder means connected between the receiver housing and the acidic attrition mill in open communication with the receiver chamber through the bottom discharge outlet of the receiver housing and in open communication with the eye of the acidic attrition mill for conveying cellulosic material from the bottom of the receiver housing to the eye of the acidic attrition mill, said feeder means being capable of operating under a pressure of 3 to 10 atmospheres; and means in open communication with the eye of the acidic attrition mill for introducing acidic digestion chemicals to the interior thereof.

7. Apparatus, as recited in claim 6, wherein the means connected to the receiver housing for transferring cellulosic material at atmospheric pressure to the receiver chamber comprises:

a hopper, providing a hopper chamber and having an opening at the top thereof in open communication with the atmosphere for receiving cellulosic material, and an opening in the bottom thereof for the discharge of said cellulosic material; and plug plunger screw feeder means connected between the hopper and the receiver housing in open communication with the hopper chamber to the bottom discharge opening and in open communication with the receiver chamber through the receiver housing opening for receiving the cellulosic material, for conveying the cellulosic material from the bottom of the hopper to the receiver chamber, while maintaining the pressure in said receiver chamber.

8. Apparatus, as recited in claim 6, wherein the means connected to the receiver housing for transferring cellulosic material at atmospheric pressure to the receiver chamber, comprises:

a hopper, disposed above the receiver housing, providing a hopper chamber having an opening in the top thereof in open communication with the atmosphere for receiving cellulosic material, and an opening in the bottom thereof for the discharge of said cellulosic material; and star valve means connected between the hopper and the receiver housing in open communication with the hopper chamber through the bottom discharge opening and in open communication with the receiver chamber through the receiver housing opening for conveying the cellulosic material from the bottom of the hopper to the receiver chamber, while maintaining pressure in said receiver chamber.

* * * * *